United States Patent
Nakamoto et al.

(10) Patent No.: US 11,289,923 B2
(45) Date of Patent: Mar. 29, 2022

(54) PROTECTIVE DEVICE

(71) Applicant: GS Yuasa International Ltd., Kyoto (JP)

(72) Inventors: Takeshi Nakamoto, Kyoto (JP); Daisuke Konishi, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 0 days.

(21) Appl. No.: 16/493,247

(22) PCT Filed: Mar. 5, 2018

(86) PCT No.: PCT/JP2018/008293
§ 371 (c)(1),
(2) Date: Sep. 11, 2019

(87) PCT Pub. No.: WO2018/168544
PCT Pub. Date: Sep. 20, 2018

(65) Prior Publication Data
US 2020/0119575 A1     Apr. 16, 2020

(30) Foreign Application Priority Data

Mar. 14, 2017 (JP) .............................. JP2017-048317

(51) Int. Cl.
*H02J 7/00* (2006.01)
*B60R 16/033* (2006.01)
*H01M 10/42* (2006.01)

(52) U.S. Cl.
CPC ........ *H02J 7/00302* (2020.01); *B60R 16/033* (2013.01); *H01M 10/425* (2013.01);
(Continued)

(58) Field of Classification Search
CPC .. H02J 7/00302; H02J 7/00306; H02J 7/0014; H02J 7/02; H02J 2310/40;
(Continued)

(56) References Cited

U.S. PATENT DOCUMENTS

2006/0028168 A1 *  2/2006  Nishida ................. H02J 7/0031
                                                          320/106
2011/0089900 A1    4/2011  Hogari et al.
(Continued)

FOREIGN PATENT DOCUMENTS

JP     H09-266015 S      10/1997
JP     2002-190288 A      7/2002
(Continued)

OTHER PUBLICATIONS

International Search Report (ISR) (PCT Form PCT/ISA/210), in PCT/JP2018/008293, dated Apr. 3, 2018.

*Primary Examiner* — John W Poos
*Assistant Examiner* — Alex W Lam
(74) *Attorney, Agent, or Firm* — McGinn I.P. Law Group, PLLC.

(57) ABSTRACT

A protective device connected between an external terminal provided in an energy storage apparatus and a power cable extending from a vehicle, the protective device includes a current interruption device that interrupts electric conduction between the vehicle and the energy storage apparatus in response to a command of a CPU in a battery management device provided in the energy storage apparatus.

18 Claims, 5 Drawing Sheets

(52) U.S. Cl.
CPC ........ *H02J 7/0014* (2013.01); *H02J 7/00306* (2020.01); *H01M 2010/4271* (2013.01); *H01M 2220/20* (2013.01)

(58) Field of Classification Search
CPC ..... H02J 7/0016; H02J 7/0031; B60R 16/033; B60R 16/03; H01M 10/425; H01M 2010/4271; H01M 2220/20; H01M 2200/00; H01M 10/44; Y02E 60/10; Y02T 10/70; H02H 7/18
See application file for complete search history.

(56) References Cited

U.S. PATENT DOCUMENTS

| | | | |
|---|---|---|---|
| 2011/0140665 A1 | 6/2011 | Tamezane et al. | |
| 2012/0049621 A1* | 3/2012 | Shinoda | B60L 53/305 307/10.1 |
| 2013/0106354 A1* | 5/2013 | Suzuki | H02J 7/0016 320/116 |
| 2014/0253046 A1* | 9/2014 | Poznar | H01M 10/633 320/136 |
| 2015/0306967 A1* | 10/2015 | Cohen | B60L 3/12 701/32.3 |
| 2015/0369867 A1* | 12/2015 | Kanada | H01M 10/4207 324/432 |
| 2016/0039291 A1* | 2/2016 | Reese | G01R 31/386 701/29.3 |
| 2016/0193925 A1* | 7/2016 | Takada | H01M 2/34 701/22 |
| 2016/0226107 A1* | 8/2016 | Worry | H01M 10/4207 |
| 2016/0241027 A1* | 8/2016 | Lei | H02J 7/0036 |
| 2016/0244002 A1* | 8/2016 | Berg | H02J 7/0047 |

FOREIGN PATENT DOCUMENTS

| | | |
|---|---|---|
| JP | 2003-180037 A | 6/2003 |
| JP | 2009-015744 A | 1/2009 |
| JP | 2011-086469 A | 4/2011 |
| JP | 2011-109794 A | 6/2011 |
| JP | 2011-130551 A | 6/2011 |
| JP | 2012-028186 A | 2/2012 |
| JP | 2012-234629 A | 11/2012 |
| JP | 2013-230003 A | 11/2013 |

* cited by examiner

PROTECTIVE DEVICE

TECHNICAL FIELD

The present invention relates to a protective device.

BACKGROUND ART

A power supply device described in JP-A-2011-130551 (Patent Document 1) is known as a power supply device including a large number of battery cells. A current interruption device that prevents the battery cell from being overdischarged or overcharged and a forced discharge circuit that prevents a cell voltage of the battery cell from becoming higher than a predetermined voltage are provided in the power supply device.

PRIOR ART DOCUMENT

Patent Document

Patent Document 1: JP-A-2011-130551

SUMMARY OF THE INVENTION

Problems to be Solved by the Invention

The whole power supply device including the current interruption device and the like is replaced when the battery cell is degraded. Devices such as the current interruption device are discarded even though the devices are not degraded. Because the current interruption device and the like generate a large amount of heat during operation, the power supply device tends to be enlarged in order to ensure heat dissipation of the current interruption device and the like, and a size and a weight of the power supply device are hardly reduced.

In the description, the heat dissipation of each device is improved while wasteful discard of the device and an increase in size of the power supply device are prevented.

Means for Solving the Problems

A protective device connected between an external terminal provided in an energy storage apparatus and a vehicle, the protective device includes a current interruption device that interrupts electric conduction between the vehicle and the energy storage apparatus under control of a battery management device provided in the energy storage apparatus.

Advantages of the Invention

The protective device including the current interruption device is disposed at a position separated from the energy storage apparatus, so that the current interruption device and the like can continuously be used when the energy storage apparatus is replaced due to a decrease in electric performance of the energy storage apparatus. Consequently, the current interruption device and the like that is not degraded can be prevented from being wastefully discarded. By disposing the current interruption device at the position separated from the energy storage apparatus, the heat dissipation of the current interruption device can be improved as compared with the case where the current interruption device is disposed in the energy storage apparatus. Thus, miniaturization and weight reduction of the energy storage apparatus can be achieved. Additionally, a temperature rise can be prevented in the energy storage apparatus.

MODE FOR CARRYING OUT THE INVENTION

Outline of Embodiment

Figure 1:
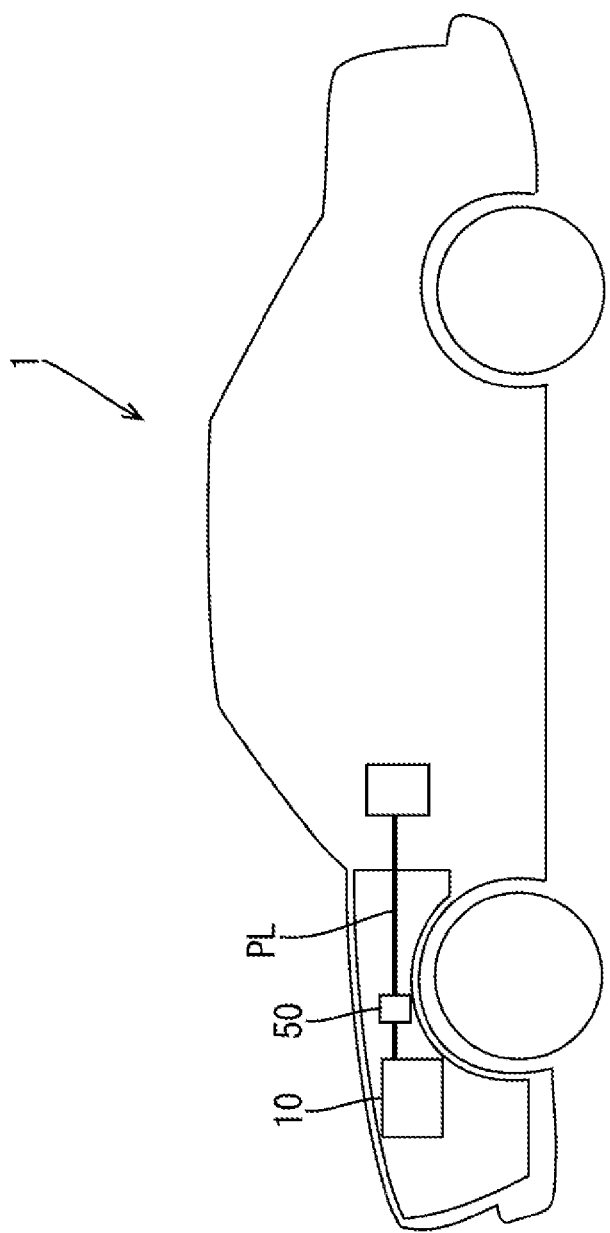
FIG. 1 is a view illustrating a vehicle to which a protective device is connected.

An outline of a protective device disclosed in an embodiment will be described.

A protective device connected between an external terminal provided in an energy storage apparatus and a vehicle, the protective device includes a current interruption device that interrupts electric conduction between the vehicle and the energy storage apparatus under control of a battery management device provided in the energy storage apparatus.

The inventors focused on wastefulness of the current interruption device because the entire energy storage apparatus including the current interruption device is replaced even though the current interruption device is rarely used when an electric characteristic of the energy storage apparatus is degraded.

The present inventors considered that the current interruption device is disposed in the protective device connected between the external terminal of the energy storage apparatus and the vehicle. When replacing the energy storage apparatus, the current interruption device is disposed in the protective device connected between the external terminal of the energy storage apparatus and the vehicle, so that the current interruption device and the like can continuously be used, and prevented from being wastefully discarded.

The current interruption device is disposed in the protective device connected between the external terminal of the energy storage apparatus and the vehicle. The heat dissipation of the current interruption device can be improved by disposing the current interruption device at the position separated from the energy storage apparatus. Consequently, as compared with the case where the current interruption device is disposed in the energy storage apparatus, the heat dissipation of the current interruption device can be improved, and the miniaturization and the weight reduction of the energy storage apparatus can be achieved. Additionally, a temperature rise can be prevented in the energy storage apparatus.

A method in which the current interruption device of the protective device is operated by a control device or the like on a vehicle side is also conceivable. However, when the protective device is operated on the vehicle side, a state of the energy storage apparatus is once transmitted to the vehicle side, and the protective device is controlled through the vehicle. For this reason, when a malfunction is generated on the vehicle side, sometimes the control of the current interruption device is delayed or the current interruption device cannot be controlled.

On the other hand, according to the above, the current interruption device can directly be operated by the battery management device of the energy storage apparatus. Consequently, the delay in the operation of the current interruption device and the inoperable state of the current interruption device due to the malfunction on the vehicle side can be prevented as compared with the case where the current interruption device is indirectly operated through the control device or the like on the vehicle side. As a result, the energy storage apparatus can be used without any problems.

The protective device may further include an equalization circuit that is provided so as to be controllable by the battery management device and equalizes a variation in charge capacity between a plurality of energy storage devices provided in the energy storage apparatus.

The equalization circuit is disposed outside the energy storage apparatus, so that the heat dissipation of the equalization circuit that is generated when the variation in charge capacity between the energy storage devices is equalized can be improved. The temperature rise can be prevented in the energy storage apparatus by providing the equalization circuit in the external protective device.

A protective device connected between an external terminal provided in an energy storage apparatus including a plurality of energy storage devices and a vehicle, the protective device includes an equalization circuit that equalizes a variation in charge capacity between the plurality of energy storage devices under control of a battery management device provided in the energy storage apparatus.

The equalization circuit can continuously be used when the energy storage apparatus is replaced, so that the equalization circuit that is not degraded can be prevented from being wastefully discarded. The heat dissipation of the equalization circuit can be improved by disposing the equalization circuit outside the energy storage apparatus. Consequently, as compared with the case where the equalization circuit is disposed in the energy storage apparatus, the temperature rise can be prevented in the energy storage apparatus, and the miniaturization and the weight reduction of the energy storage apparatus can be achieved. Because the equalization circuit can directly be operated by the battery management device of the energy storage apparatus, the generation of the malfunction in the operation of the equalization circuit due to the malfunction of the vehicle can be prevented as compared with the case where the equalization circuit is indirectly operated through the control device or the like on the vehicle side.

The protective device may be incorporated in a part of a power supply line connected to the vehicle.

The protective device is incorporated in a part of the power supply line connected to the vehicle, so that the energy storage apparatus and the vehicle are prevented from being directly connected without disposing the protective device between the vehicle and the external terminal of the energy storage apparatus.

The protective device may further include an identification circuit that determines whether the energy storage apparatus is a genuine energy storage apparatus based on an identifier of the energy storage apparatus.

When the energy storage apparatus is the unauthorized product that is different from the genuine product even if the protective device is disposed between the vehicle and the energy storage apparatus, there is a possibility that the malfunction is generated in the operation of the current interruption device or the equalization circuit of the protective device.

The identification circuit is provided, so that whether the energy storage apparatus is the genuine product can be determined using the identifier of the energy storage apparatus when the energy storage apparatus is connected to the protective device. Consequently, the unauthorized energy storage apparatus can be prevented from being connected to the protective device and the vehicle, and the generation of the malfunction can be prevented in the operation of the current interruption device and the equalization circuit.

Embodiment

Embodiments disclosed in the description will be described with reference to FIGS. 1 to 4.

As illustrated in FIG. 1, a protective device 50 is connected between a vehicle 1 such as an automobile and an energy storage apparatus 10 that starts an engine mounted on the vehicle 1. The protective device 50 is connected to a power cable (an example of the "power line") PL extending from a vehicle load (not illustrated) and a vehicle generator (not illustrated) mounted on the vehicle 1.

Figure 2:
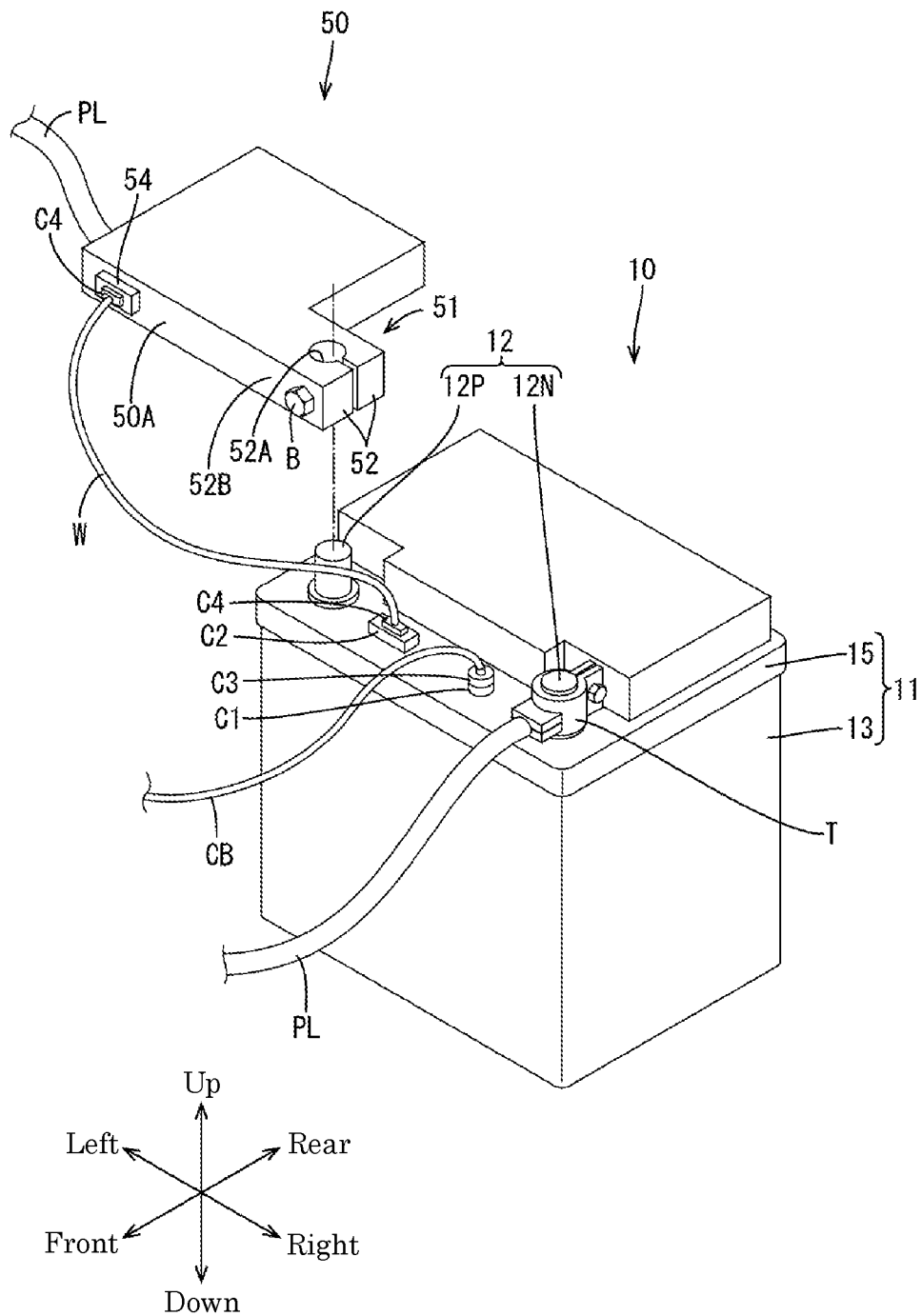
FIG. 2 is a perspective view illustrating a state before the protective device incorporated in a power cable is connected to an energy storage apparatus.

As illustrated in FIG. 2, the energy storage apparatus 10 includes a block-shaped battery case 11. An assembled battery 20 formed by connecting a plurality of energy storage devices 21 in series, a control board (not illustrated), and the like are accommodated in the battery case 11.

When referring to FIG. 2 in the following description, a vertical direction is based on a vertical direction of the battery case 11 when the battery case 11 is horizontally placed without being inclined with respect to an installation surface. In a front-rear direction, a left front side in the drawing is set to a front side based on a direction (depth direction) along a short side of the battery case 11. In a right and left direction, a right front side in the drawing is set to a right direction based on a direction along the long side of the battery case 11.

The battery case 11 is made of a synthetic resin, and includes a box-shaped case body 13 and an upper lid 15 attached to an upper portion of the case body 13.

For example, the energy storage device 21 is a lithium ion secondary battery using a negative active material of a carbon-based material such as graphite, graphitizable carbon, and non-graphitizable carbon and a positive active material of an iron phosphate-based material such as lithium iron phosphate. The assembled battery 20 includes a plurality of energy storage devices 21 connected in series.

The upper lid 15 has a substantially rectangular shape in planar view. As illustrated in FIG. 2, a pair of external terminals 12 to which a wire harness provided in the vehicle 1 is connected is embedded in the upper lid 15 at both ends in the right and left direction of the upper lid 15.

The pair of external terminals 12 is made of metal such as a lead alloy, and each of the external terminals 12 has a substantially columnar shape. One (the left side in FIG. 2) of the pair of external terminals 12 is a positive electrode terminal 12P to which the protective device 50 is connected. The other (the right side in FIG. 2) of the pair of external terminals 12 is a negative electrode terminal 12N to which a battery terminal T provided in the power cable PL extending from the vehicle 1 is connected.

A communication connector C1 used to communicate with a vehicle ECU provided in the vehicle 1 and a protective device connector C2 connected to the protective device 50 are provided between the pair of external terminals 12 in the upper lid 15.

The communication connector C1 is different from the protective device connector C2 in a shape, and is connected to a vehicle connector C3 provided on a communication cable CB extending from the vehicle ECU.

The protective device connector C2 is connected to a protective connector C4 provided in a protective wire harness W. The protective wire harness W is constructed by bundling a plurality of electric wires up, and includes a communication cable connected to a BMU 30 (to be described later), a power supply cable supplying electric power from the assembled battery 20 to the protective device 50, and a plurality of (in the present embodiment, five) discharge cables connected to the assembled battery 20.

An electric configuration of the energy storage apparatus 10 will be described with reference to FIG. 3.

Figure 3:
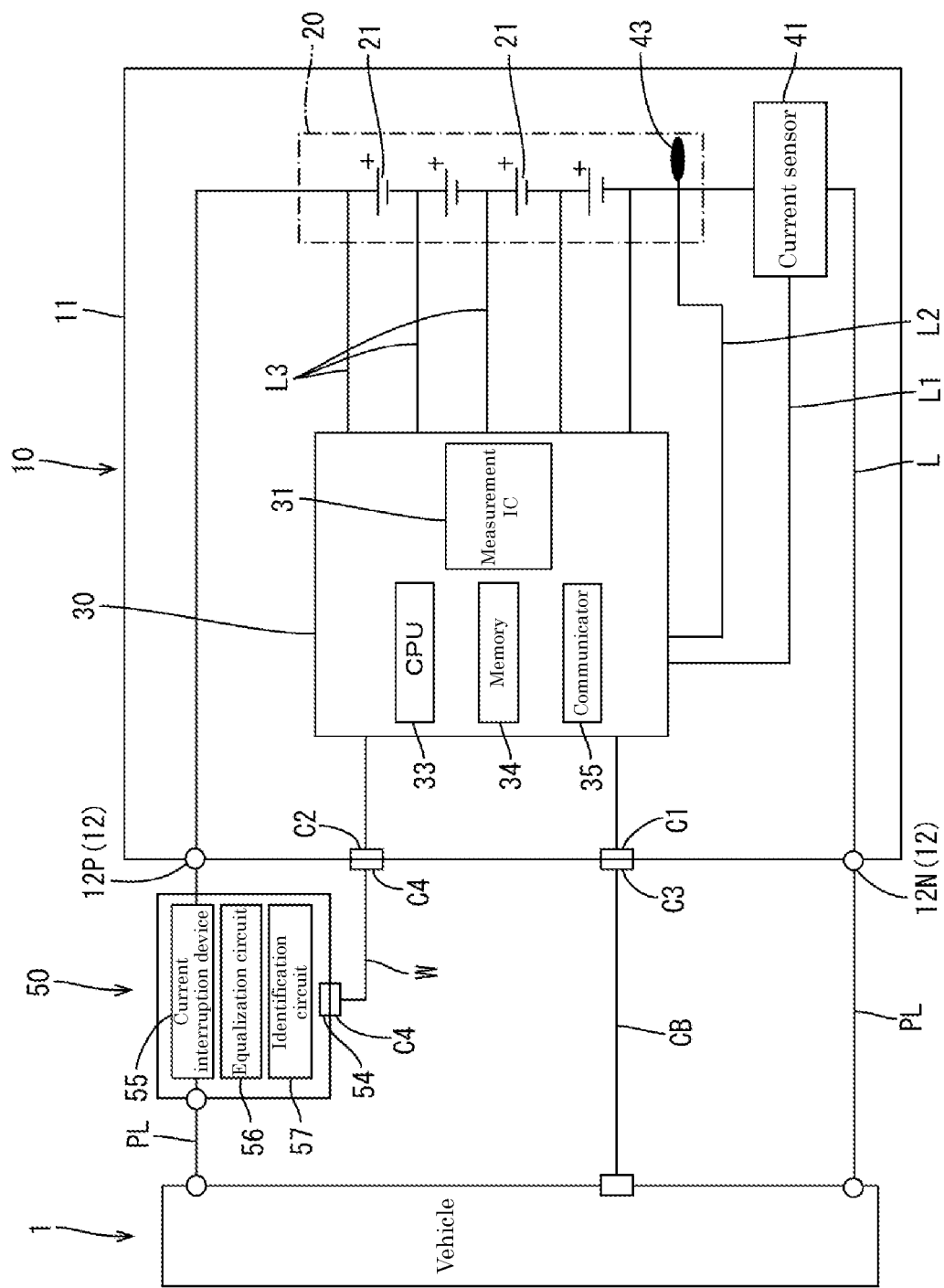
FIG. 3 is a block diagram illustrating the protective device, the vehicle, and the energy storage apparatus.

As illustrated in FIG. 3, the energy storage apparatus 10 includes the assembled battery 20, a battery management device (hereinafter referred to as "BMU") 30, a current sensor 41, and a temperature sensor 43, and is disposed in the battery case 11.

The assembled battery 20 and the current sensor 41 are connected in series through an electric conduction path L. The positive electrode of the assembled battery 20 is connected to the positive electrode terminal 12P by the electric conduction path L, and the negative electrode of the assembled battery 20 is connected to the negative electrode terminal 12N through the current sensor 41 by the electric conduction path L. The vehicle load on the assembled battery 20 and charge-discharge of the vehicle generator are performed through the pair of external terminals 12 and the electric conduction path L.

The current sensor 41 is a sensor that measures current flowing through the electric conduction path L. The current sensor 41 is connected to the BMU 30 by a signal line L1. A current measurement value measured by the current sensor 41 is taken into the BMU 30 through the signal line L1.

The temperature sensor 43 is a contact type or non-contact type, and measures a temperature of the assembled battery 20. The temperature sensor 43 is connected to the BMU 30 by a signal line L2, and the temperature measurement value measured by the temperature sensor 43 is taken into the BMU 30 through the signal line L2.

Both ends of each energy storage device 21 in the assembled battery 20 are connected to the BMU 30 by five voltage detection lines L3. The cell voltage of each energy storage device 21 and the battery voltage of the assembled battery 20 (a total voltage of the plurality of energy storage devices 21) are taken into the BMU 30 through the voltage detection line L3.

The BMU 30 includes a measurement IC 31, a CPU 33, a memory 34, and a communicator 35. The BMU 30 is connected to the electric conduction path L to receive supply of electric power from the assembled battery 20.

The measurement IC 31 measures the current, the voltage (the cell voltage of each energy storage device 21 and the total voltage of the energy storage devices 21), and the like of the energy storage devices 21 from output signals of the assembled battery 20, the current sensor 41, the temperature sensor 43, and the like.

For example, the memory 34 is a nonvolatile memory such as a flash memory and an EEPROM. The memory 34 stores various programs such as a program managing each energy storage device 21 or the assembled battery 20, data necessary for execution of the various programs, for example, identification data indicating a type of the energy storage apparatus.

The communicator 35 is communicably connected to a vehicle ECU or the like (not illustrated) provided in the vehicle 1 through the communication connector C1 provided in the battery case 11 by LIN communication or CAN communication.

The CPU 33 is a central processing unit, and periodically monitors the current, voltage, and the like of the energy storage device 21 measured by the measurement IC 31.

As illustrated in FIG. 2, the protective device 50 has a flat block shape. The left end of the protective device 50 is fixed to the power cable PL extending from the vehicle 1. The protective device 50 is incorporated in the power cable PL as a fixed component for the power cable PL.

The power cable PL and the protective device 50 are electrically connected to each other such that a vehicle terminal (not illustrated) provided in the power cable PL and a device terminal (not illustrated) provided in the protective device 50 cannot be removed from each other in a normally foreseeable use situation.

The protective device 50 is a terminal connection unit 51 in which the right end can be connected to the positive electrode terminal 12P of the energy storage apparatus 10.

The terminal connection unit 51 includes a pair of sandwiching units 52 that can clamp the positive electrode terminal 12P from an outside in a radial direction. A contact 52A is provided at portions of the pair of sandwiching units 52 opposed to each other.

Each contact 52A sandwiches the positive electrode terminal 12P from the outside in the radial direction by tightening a fastening bolt B provided on an outer surface 52B of the sandwiching unit 52. The contact 52A electrically connects the terminal connection unit 51 and the positive electrode terminal 12P by sandwiching the positive electrode terminal 12P. Consequently, the power cable PL extending from the vehicle 1 and the positive electrode terminal 12P of the energy storage apparatus 10 are electrically connected to each other through the protective device 50.

A connector 54 to which the protective connector C4 of the protective wire harness W connected to the energy storage apparatus 10 is connected is provided in an outer surface 50A of the protective device 50.

As illustrated in FIG. 3, the electrical configuration of the protective device 50 includes a current interruption device 55, an equalization circuit 56, and an identification circuit 57. The current interruption device 55 and the circuits 56, 57 are connected to the BMU 30 and the assembled battery 20 of the energy storage apparatus 10 through the protective wire harness W connected to the connector 54.

The current interruption device 55 is a semiconductor switch (FET) or a latch type relay. As illustrated in FIG. 3, in the current interruption device 55, one end is connected to the terminal connection unit 51 and the other end is connected to the vehicle terminal. The power cable PL extending from the vehicle 1 is connected to the positive electrode terminal 12P of the energy storage apparatus 10 through the current interruption device 55.

A command to perform switching between open and close can be transmitted from the BMU 30 of the energy storage apparatus 10 to the current interruption device 55 through the communication cable of the protective wire harness W. In an initial state, the current interruption device 55 is in a state where the contact is open. By receiving the command from the BMU 30 through the communication cable, the contact can mechanically be closed or opened by electromagnetic action.

When the assembled battery 20 of the energy storage apparatus 10 is determined to reach an overcharge state or an overdischarge state, the CPU 33 can open the current interruption device 55 of the protective device 50 through the protective wire harness W to interrupt the charge-discharge from the vehicle 1.

The identification circuit 57 is connected to the BMU 30 of the energy storage apparatus 10 through the communication cable of the protective wire harness W. The identification circuit 57 receives the identification data stored in the memory 34 of the BMU 30 through the communication cable, and compares the received identification data to the verification data stored in the identification circuit 57.

When the energy storage apparatus 10 is identified to be the genuine energy storage apparatus, the identification circuit 57 permits communication between the current interruption device 55 and the BMU 30. When communication is permitted, the protective device 50 and the energy storage apparatus 10 can electrically be connected to each other by transmitting a command to close the contact from the CPU 33 to the current interruption device 45 through the communication cable. When the energy storage apparatus 10 is identified to be not the genuine energy storage apparatus, the identification circuit 57 prohibits the communication between the current interruption device 55 and the BMU 30. The current interruption device 45 is kept open by prohibiting the communication, so that use of an unauthorized energy storage apparatus is prevented.

Figure 4:
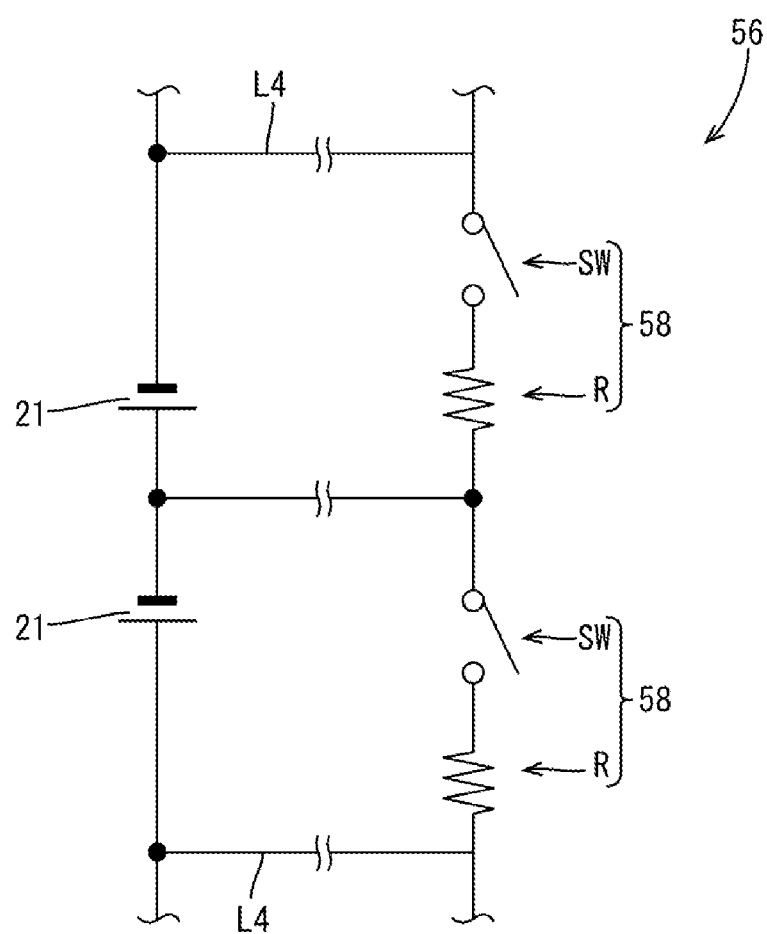
FIG. 4 is a circuit diagram of an equalization circuit.

The equalization circuit 56 is connected to the assembled battery 20 through five discharge cables in the protective wire harness W. As illustrated in FIG. 4, the equalization circuit 56 includes a plurality of sets (in the present embodiment, four sets) of discharge circuits 58 each of which includes a discharge resistor R and a discharge switch SW. Each discharge circuit 58 is connected to a discharge line IA (discharge cable) connected to both ends of each energy storage device 21.

Each discharge circuit 58 can individually discharge each energy storage device 21 by turning on the discharge switch SW according to the command from the BMU 30. Thus, when the CPU 33 detects that the energy storage device 21 exceeds a reference voltage value starting equalization processing, the CPU 33 operates the discharge circuit 58. Consequently, the energy storage device 21 is discharged, and a variation in charge capacity among the energy storage devices 21 can be equalized by reducing a difference in charge amount among the energy storage devices 21.

The action and effect of the protective device 50 will be described.

In the energy storage apparatus 10 that starts the engine mounted on the vehicle 1, not only the energy storage device 21 but also the entire energy storage apparatus 10 are replaced when the energy storage device 21 is degraded due to a decrease in electric performance.

When the energy storage apparatus 10 includes the current interruption device 55 that protects the overcharged state or the overdischarged state and the equalization circuit 56 that equalizes the variation in charge capacity between energy storage devices, the current interruption device 55 and the equalization circuit 56 are discarded although the current interruption device 55 and the equalization circuit 56 are not degraded, and the current interruption device 55 and the equalization circuit 56 are wasted. Because the current interruption device 55 and the equalization circuit 56 generate a large amount of heat during the operation, when the current interruption device 55 and the equalization circuit 56 are provided in the energy storage apparatus 10, the energy storage apparatus 10 is enlarged in order to secure the heat dissipation.

The present inventors focused on these points, and found that the current interruption device 55 and the equalization circuit 56 are connected to the power cable PL in the state in which the current interruption device 55 and the equalization circuit 56 cannot be removed in the normally foreseeable use situation.

The protective device 50 is provided in the power cable PL extending from the vehicle 1 so as to be connectable to the external terminal 12 provided in the energy storage apparatus 10, and the current interruption device 55 and the equalization circuit 56 are disposed in the protective device 50. Consequently, when replacing the energy storage apparatus 10, the current interruption device 55 and the equalization circuit 56 are continuously used, and the current interruption device 55 and the equalization circuit 56 can be prevented from being wastefully discarded.

The heat dissipation of the current interruption device 55 and the equalization circuit 56 is improved by disposing the current interruption device 55 and the equalization circuit 56 at the position separated from the energy storage apparatus 10. The miniaturization and the weight reduction of the energy storage apparatus 10 can be achieved while the temperature rise is prevented in the energy storage apparatus 10.

It is also conceivable that the state such as the voltage and the current of the energy storage apparatus 10 is transmitted from the BMU 30 to the control device or the like of the vehicle 1 to indirectly operate the current interruption device 55 and the equalization circuit 56 through the control device or the like of the vehicle 1 when the protective device 50 including the current interruption device 55 and the equalization circuit 56 is connected between the external terminal 12 of the energy storage apparatus 10 and the vehicle 1.

However, when the current interruption device 55 and the equalization circuit 56 are driven by the control device of the vehicle 1, the state of the energy storage apparatus 10 is once transmitted onto the vehicle side, and the current interruption device 55 and the equalization circuit 56 are operated through the vehicle. Thus, when the malfunction is generated in the control device or the like of the vehicle 1, the operation of the current interruption device 55 and the equalization circuit 56 is delayed, or the current interruption device 55 and the equalization circuit 56 cannot be operated.

In the present embodiment, the BMU 30 of the energy storage apparatus 10 directly operates the current interruption device 55 and the equalization circuit 56 without passing through the vehicle 1. Thus, the generation of the malfunction of the current interruption device 55 and the equalization circuit 56 due to the malfunction of the vehicle 1 can be prevented as compared with the case where the current interruption device 55 and the equalization circuit 56 are indirectly operated through the vehicle 1. Consequently, the energy storage apparatus 10 can be used without any problems.

The protective device 50 is connected to the power cable PL extending from the vehicle 1 in the state in which the protective device 50 cannot be removed from the power cable PL in the normally foreseeable use situation. Thus, the energy storage apparatus 10 and the vehicle 1 can be prevented from being directly connected without disposing the protective device 50.

When the energy storage apparatus 10 is the unauthorized product that is different from the genuine product even if the protective device 50 is disposed between the vehicle 1 and the energy storage apparatus 10, there is a possibility that the malfunction is generated in the operation of the current interruption device 55 or the equalization circuit 56 of the protective device 50.

The protective device 50 includes the identification circuit 57, and the identification circuit 57 identifies whether the energy storage apparatus 10 connected to the protective device 50 is the genuine product. As a result of the identification, when the energy storage apparatus 10 is identified as the genuine energy storage apparatus, the protective device 50 and the energy storage apparatus 10 are electrically connected to each other. On the other hand, when the energy storage apparatus 10 is identified to be not the genuine energy storage apparatus, the communication between the current interruption device 55 and the BMU 30 is interrupted. Consequently, the use of the unauthorized energy storage apparatus 10 can be prevented.

The protective device 50 is connected to the power cable PL extending from the vehicle 1, and connected to the external terminal 12 of the energy storage apparatus 10. However, as illustrated in FIG. 5, a protective device 150 may be provided at a position in the middle of the power cable PL extending from the vehicle 1 as a modification of the protective device 50.

(Modification)

Figure 5:
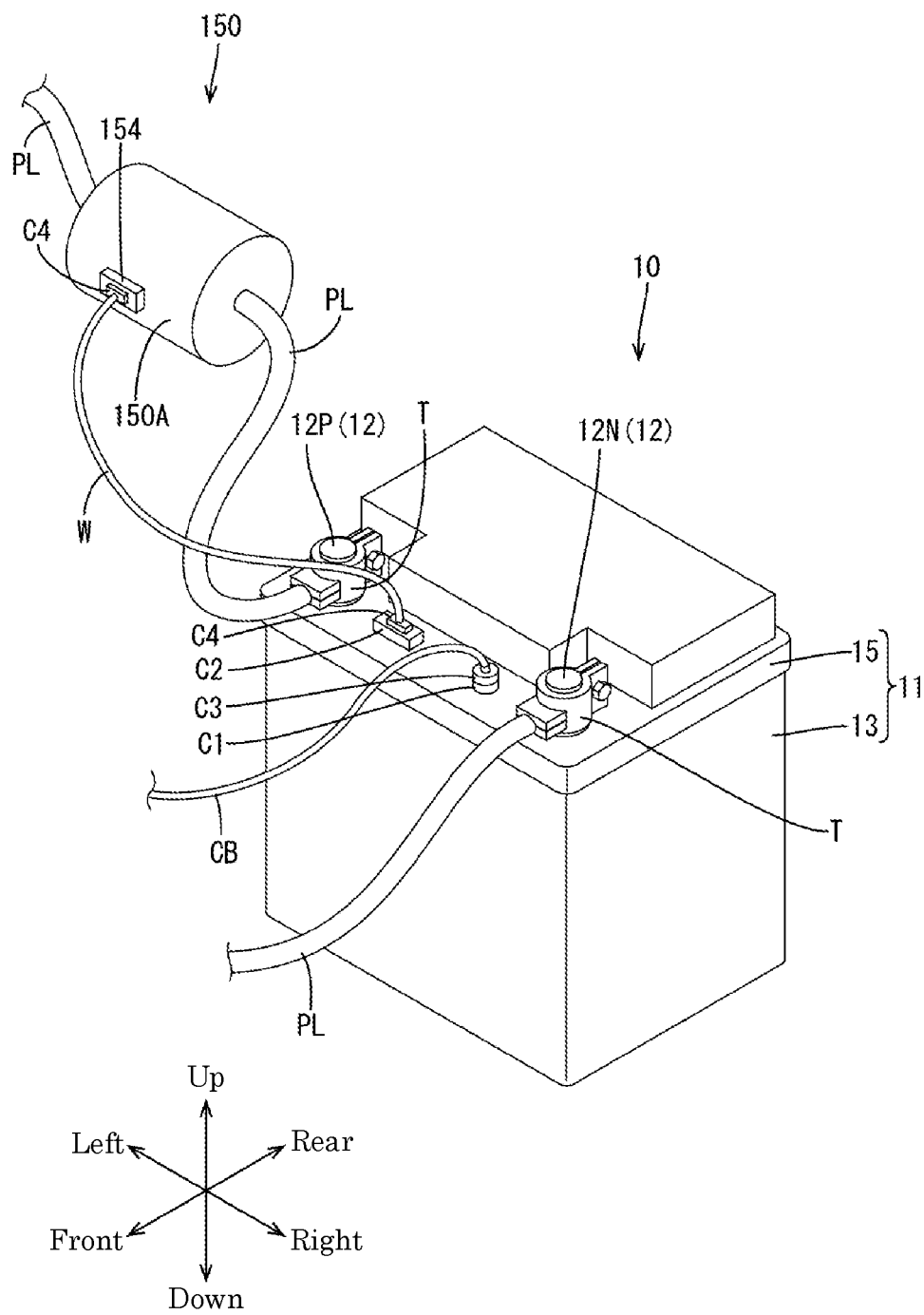
FIG. 5 is a perspective view illustrating a modification of the protective device, and is a perspective view illustrating a state before the protective device incorporated in the power cable is connected to the energy storage apparatus.

As illustrated in FIG. 5, the protective device 150 of the modification has a substantially columnar shape, and is disposed at an intermediate position of the power cable PL extending from the vehicle 1. The power cable PL and the protective device 50 are connected to each other such that the vehicle terminal (not illustrated) provided in the power cable PL and the device terminal (not illustrated) provided in the protective device 50 cannot be removed from each other in the normally foreseeable use situation Thus, the power cable PL includes the same battery terminal T as the battery terminal T connected to the negative electrode terminal 12N.

A connector 154 to which the protective connector C4 of the protective wire harness W is connected is provided in a side unit 150A of the protective device 150 of the modification. Because the electrical configuration of the protective device 50 of the modification has the same configuration and action as the first embodiment, the description will be omitted.

As described above, the protective device 150 of the modification is disposed at the intermediate position of the power cable PL, and the same battery terminal T as the battery terminal T connected to the negative electrode terminal 12N is provided in the power cable PL. Consequently, when replacing the energy storage apparatus 10, a worker can connect the battery terminal T of the power cable PL to the external terminal 12 in the same manner as the conventional technique without worrying about presence or absence of the protective device 50.

Other Embodiments

The technique disclosed in the description is not limited to the embodiment described above with reference to the drawings, but the technique includes various aspects described below.

(1) In the embodiment, the protective devices 50, 150 are incorporated in the power cable PL extending from the vehicle 1. However, the present invention is not limited to the embodiment, and the protective device may be connected to the vehicle, and the power cable may extend from the protective device.

(2) In the above embodiment, the protective device 50 includes both the current interruption device 55 and the equalization circuit 56. However, the present invention is not limited to the embodiment, and the protective device may include only the power interruption device, or the protective device may include only the equalization circuit.

(3) In the embodiment, the protective device 50 includes the identification circuit 57. However, the present invention is not limited to the embodiment, and the protective device may not include the identification circuit as long as the genuine energy storage apparatus is connected to the protective device.

(4) In the embodiment, the protective device 50 is connected between the vehicle 1 such as the automobile and the energy storage apparatus 10 mounted on the vehicle 1. However, the present invention is not limited to the embodiment, and the protective device may be connected between a two-wheeled vehicle or a three-wheeled vehicle and the energy storage apparatus, or connected between other various vehicles and the energy storage apparatus.

DESCRIPTION OF REFERENCE SIGNS

1: vehicle
10: energy storage apparatus
12: external terminal
21: energy storage device
30: battery management device
50: protective device
55: current interruption device
56: equalization circuit
57: identification circuit
PL: power cable (example of "power line")

The invention claimed is:

1. A protective device connected between an external terminal provided in an energy storage apparatus and a vehicle, the protective device comprising:
   a current interruption device that interrupts an electric conduction between the vehicle and the energy storage apparatus under control of a battery management device provided in the energy storage apparatus;
   an identification circuit that determines whether the energy storage apparatus is a genuine energy storage apparatus,
      wherein the identification circuit is configured to control a communication between the current interruption device and the battery management device based on whether or not the energy storage apparatus is determined to be the genuine energy storage apparatus; and
   an equalization circuit that is provided so as to be controllable by the battery management device and equalizes a variation in a charge capacity between a plurality of energy storage devices provided in the energy storage apparatus,
   wherein the equalization circuit is located outside of an enclosure of the energy storage apparatus that encloses the energy storage devices, the external terminal protruding to the outside of the enclosure, and
   wherein the external terminal protrudes oppositely to an installation surface where the energy storage apparatus is placed, and the energy storage devices and the battery management device are completely located below a top surface of the enclosure.

2. A protective device connected between an external terminal provided in an energy storage apparatus including a plurality of energy storage devices and a vehicle, the protective device comprising:
- an equalization circuit that equalizes a variation in a charge capacity between the plurality of energy storage devices under control of a battery management device provided in the energy storage apparatus,
- wherein the equalization circuit is located outside of an enclosure of the energy storage apparatus that encloses the energy storage devices, the external terminal protruding to the outside of the enclosure, and
- wherein the external terminal protrudes oppositely to an installation surface where the energy storage apparatus is placed, and the energy storage devices and the battery management device are completely located below a top surface of the enclosure.

3. The protective device according to claim 1, wherein the protective device is incorporated in a part of a power supply line connected to the vehicle.

4. The protective device according to claim 1, wherein the identification circuit determines whether the energy storage apparatus is the genuine energy storage apparatus based on an identifier of the energy storage apparatus.

5. The protective device according to claim 2, wherein the protective device is incorporated in a part of a power supply line connected to the vehicle.

6. The protective device according to claim 2, further comprising an identification circuit that determines whether the energy storage apparatus is a genuine energy storage apparatus based on an identifier of the energy storage apparatus.

7. The protective device according to claim 1, wherein, when the energy storage apparatus is determined not to be the genuine energy storage apparatus, the identification circuit is configured to prohibit the communication between the current interruption device and the battery management device.

8. The protective device according to claim 1, wherein, when the energy storage apparatus is determined to be the genuine energy storage apparatus, the identification circuit is configured to permit the communication between the current interruption device and the battery management device.

9. The protective device according to claim 1, further comprising:
- a power cable that connects to the vehicle; and
- a terminal connector that connects to the external terminal.

10. The protective device according to claim 1, wherein the equalization circuit is located inside the protective device and between the vehicle and the external terminal.

11. The protective device according to claim 2, further comprising:
- a power cable that connects to the vehicle; and
- a terminal connector that connects to the external terminal.

12. The protective device according to claim 11, wherein the equalization circuit is located inside the protective device and between the power cable and the terminal connector.

13. The protective device according to claim 2, wherein the equalization circuit is located inside the protective device and between the vehicle and the external terminal.

14. A power supply system of a vehicle, the power supply system comprising:
- an energy storage apparatus comprising an external terminal, a battery management device, and a plurality of energy storage devices;
- a protective device comprising an equalization circuit provided between the external terminal and the vehicle,
- wherein the equalization circuit equalizes a variation in a charge capacity between the plurality of energy storage devices under control of the battery management device,
- wherein the equalization circuit is located outside of an enclosure of the energy storage apparatus that encloses the energy storage devices, the external terminal protruding to the outside of the enclosure, and
- wherein the external terminal protrudes oppositely to, an installation surface where the energy storage apparatus is placed, and the energy storage devices and the battery management device are completely located below a top surface of the enclosure.

15. The power supply system according to claim 14, wherein the protective device further comprises:
- a current interruption device that interrupts an electric conduction between the vehicle and the energy storage apparatus under control of the battery management device.

16. The power supply system according to claim 15, wherein the protective device further comprises:
- an identification circuit that determines whether the energy storage apparatus is a genuine energy storage apparatus.

17. The power supply system according to claim 16, wherein the identification circuit is configured to control a communication between the current interruption device and the battery management device based on whether the enemy storage apparatus is determined to be the genuine energy storage apparatus.

18. The power supply system according to claim 14, wherein the protective circuit further comprises:
- a power cable that connects to the vehicle; and
- a terminal connector that connects to the external terminal,
- wherein the equalization circuit is located inside the protective device and between the power cable and the terminal connector.

* * * * *